United States Patent [19]
Zhelonkin et al.

[11] Patent Number: 5,585,558
[45] Date of Patent: Dec. 17, 1996

[54] CATASTROPHIC EVENT FORECASTING SYSTEM AND METHOD

[75] Inventors: Sergey F. Zhelonkin; Arkady G. Bubel, both of Bishkek, Kyrgyzstan

[73] Assignee: Prognosticating Scanners LLC, Stamford, Conn.

[21] Appl. No.: 504,996

[22] Filed: Jul. 20, 1995

[51] Int. Cl.$^6$ .................................................. G01W 1/00
[52] U.S. Cl. ..................... 73/170.24; 73/170.16
[58] Field of Search .............................. 73/170.16, 170.24; 364/420; 340/601, 602; 324/323, 348

[56] References Cited

U.S. PATENT DOCUMENTS

| | | | |
|---|---|---|---|
| 3,603,951 | 9/1971 | Bracken et al. | 340/539 |
| 3,898,610 | 8/1975 | Pennebaker, Jr. | 367/38 |
| 4,087,781 | 5/1978 | Grossi et al. | 340/853.7 |
| 4,287,762 | 9/1981 | Baer | 73/170.16 |
| 4,632,052 | 12/1986 | Green | 73/170.16 X |
| 4,656,867 | 4/1987 | Sasaki | 73/170.16 |
| 5,001,466 | 3/1991 | Orlinsky et al. | 340/690 |
| 5,128,866 | 7/1992 | Weakley | 364/421 |
| 5,140,523 | 8/1992 | Frankel et al. | 364/420 |
| 5,241,175 | 8/1993 | Yasunaga | 250/253 |
| 5,372,039 | 12/1994 | Wiese | 73/170.16 |
| 5,379,025 | 1/1995 | Tatom et al. | 73/170.16 X |
| 5,386,114 | 1/1995 | Yasunaga | 250/253 |
| 5,387,869 | 2/1995 | Enomoto | 324/348 |
| 5,402,520 | 3/1995 | Schnitta | 395/22 |
| 5,428,358 | 6/1995 | Gardner | 73/170.16 |

FOREIGN PATENT DOCUMENTS

| | | |
|---|---|---|
| 6167577 | 6/1994 | Japan . |
| 1638689 | 3/1991 | U.S.S.R. . |
| 1289236 | 3/1993 | U.S.S.R. . |

*Primary Examiner*—Richard Chilcot
*Assistant Examiner*—Elizabeth L. Dougherty
*Attorney, Agent, or Firm*—Dilworth & Barrese

[57] ABSTRACT

The invention relates to systems and methods for forecasting catastrophic events. An embodiment of such a system includes at least one measuring station, the measuring station including means for generating a reproducible non-equilibrium process within a local environment having a detectable energy state at a given time and means for measuring an indicia of the detectable energy state of a portion of the local environment simultaneous with the generation of the reproducible non-equilibrium process. The system also includes means for determining when the indicia of the energy state of a portion of the local environment will be at a minimum, whereby the determination of when the indicia of the energy state of a portion of the local environment will be at a minimum gives an approximate time of occurrence of the catastrophic event. The invention also includes a method for forecasting catastrophic events, comprising the steps of periodically generating a reproducible non-equilibrium process within a local environment having a detectable energy state at a given time, measuring an indicia of the detectable energy state of a portion of the local environment during generation of the non-equilibrium process, and approximating when an impending catastrophic event will occur from the measurements of the indicia of the detectable energy state of a portion of the local environment during successive generations of the non-equilibrium process.

25 Claims, 8 Drawing Sheets

CATASTROPHIC EVENT FORECASTING SYSTEM AND METHOD

BACKGROUND OF THE INVENTION

1. Field of the Invention

The present invention relates to systems and methods for the prediction of catastrophic events and, more specifically, to systems and methods for measuring changes in the energy state of regions of the environment caused by impending catastrophic events, and using that information to forecast the time and location of the event.

2. Description of the Related Art

A number of methods and systems for forecasting catastrophic events, such as earthquakes and volcanic eruptions, are known in the prior art. A "catastrophic event" is generally defined as a phenomena that is proceeded by an enormous gain in the energy state of a region of the environment, followed by a sudden or extended release of the energy into the surrounding environment. Thus, the region corresponding to a catastrophic event is ordinarily on the order of hundreds of meters to hundreds of kilometers. Catastrophic events that occur in nature include earthquakes, volcanic eruptions, hurricanes, tornados, tsunamis, etc. Catastrophic events may also be man-made, such as an accident at a nuclear reactor.

Most of the methods and systems for forecasting catastrophic phenomena rely on a relatively narrow and limited body of phenomena relating to a specific catastrophic event. Moreover, many of the methods and systems do not forecast the time of a catastrophic event might occur, only that it is impending.

For example, U.S. Pat. No. 5,387,869 to Enomoto describes electrodes disposed to detect transient electrical currents within the earth that may presage an earthquake. This phenomena, however, is not used to forecast the occurrence of other events such as, for example, a volcanic eruption or tornado. Nor would it give an indication of when the earthquake might occur.

Similarly, U.S. Pat. No. 5,386,114 to Yasunaga describes an apparatus for predicting an earthquake or volcanic eruption by measuring neutron flow of the earth's magma. While an increase in the measurement of the flow purportedly provides advance warning of an earthquake or volcanic eruption, there is no way to tell when it might occur once the flow is observed to increase. In an earlier patent, i.e., U.S. Pat. No. 5,241,175, Yasunaga purports to describe when an earthquake or volcanic eruption will occur. However, the method does nothing more than compare the current neutron flow with a nominal flow. Thus, it would only alert that such an event might be pending, not the particular time it might occur.

U.S. Pat. No. 4,656,867 to Sasaki describes a method to predict when and where an earthquake might occur based on Cirrus cloud formations. It is reported that the earthquake may only be predicted with an accuracy of between one and five days.

U.S. Pat. No. 3,603,951 to Bracken and Lane describes a sensor grid to detect changes in atmospheric conditions. While such a system might be able to predict the approximate time when a severe weather disturbance would impact a particular area, it would not be useful for forecasting other types of catastrophic phenomena that strike suddenly over a wide region, such as an earthquake.

Accordingly, there is a need for a device and method for forecasting a catastrophic event that can accurately predict when and where the catastrophic event will occur.

SUMMARY OF THE INVENTION

The present invention includes a system for forecasting when and where a catastrophic event will occur. A preferred embodiment of such a system includes at least one measuring station, the measuring station including means for generating a reproducible non-equilibrium process within a local environment having a detectable energy state at a given time and means for measuring an indicia of the detectable energy state of a portion of the local environment simultaneous with the generation of the reproducible non-equilibrium process. The system also includes means for determining when the indicia of the energy state of a portion of the local environment will be at a minimum, whereby the determination of when the indicia of the energy state of a portion of the local environment will be at a minimum gives an approximate time of occurrence of the catastrophic event. The particular means for measuring the indicia of the energy state of a portion of the local environment may be a temperature sensor or an electrical circuit with a thermistor.

The invention also includes a system for forecasting catastrophic events, including three or more geographically separated, networked measuring stations, each measuring station including means for generating a reproducible non-equilibrium process within a local environment having a detectable energy state at a given time and means for measuring an indicia of the detectable energy state of a portion of the local environment simultaneous with the generation of the reproducible non-equilibrium process. The system also includes means for providing an indicia of the change in the energy state of portions of the local environment for successively generated non-equilibrium processes at each measuring station, and means for determining the location and/or energy of the catastrophic event from the indicia of changes in energy state at each measuring station.

The invention also includes a method for forecasting catastrophic events, including the steps of periodically generating a reproducible non-equilibrium process within a local environment having a detectable energy state at a given time, measuring an indicia of the detectable energy state of a portion of the local environment during generation of the non-equilibrium process, and approximating when an impending catastrophic event will occur from the measurements of the indicia of the detectable energy state of a portion of the local environment during successive generations of the non-equilibrium process.

It also includes a method for forecasting catastrophic events, including the steps of periodically generating three or more geographically separated, reproducible non-equilibrium processes within respective local environments having detectable energy states at a given time, measuring indicia of the detectable energy states of a portion of each of the local environments during generation of each respective non-equilibrium process, and approximating the energy and location of an impending catastrophic event from the measurements of the indicia of the energy states of a portion of each of the local environments during successive generations of each respective non-equilibrium process.

DETAILED DESCRIPTION

Figure 1:
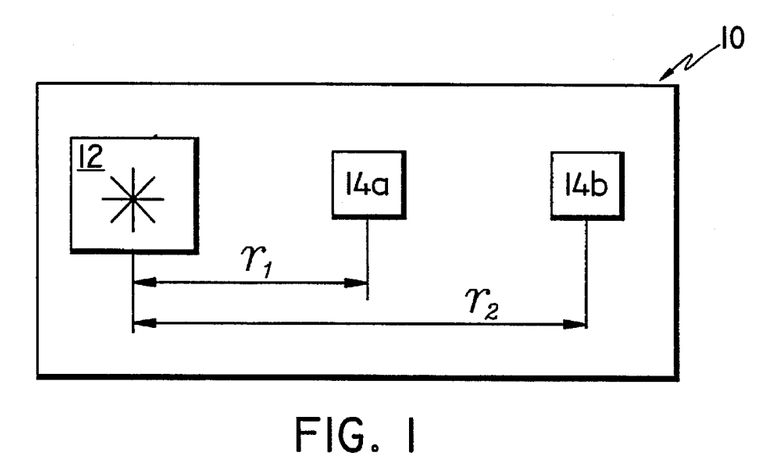
FIG. 1 is a representative drawing of a measuring station of the present invention.

Referring now to the drawings, FIG. 1 is a representative illustration of a measuring station 10 included in the present invention. The station is comprised of a local non-equilibrium process ("LNEP") 12 and two energy sensors 14a, 14b with sensing elements (described below) located at distances $r_1$ and $r_2$, respectively, from the LNEP.

The operation of the present invention may be explained by reference to fundamental principles of thermodynamics. Conservation of energy requires that any change in the internal energy of a system occurs according to:

$$dE=dQ+dW$$

where:
  dE is the change in the internal energy in the system,
  dW is the work done by the surrounding environment on the system, and
  dQ is the heat that flows into the system from the surrounding environment.

Accordingly, a change in the internal energy of a system will influence the surrounding environment, either in the form of work done to (or by) the environment, heat flow into (or from) the environment, or both. Thus, a change in internal energy of the system usually manifests itself, at least partially, in a flow of heat between the system and the surrounding environment.

Figure 1A:
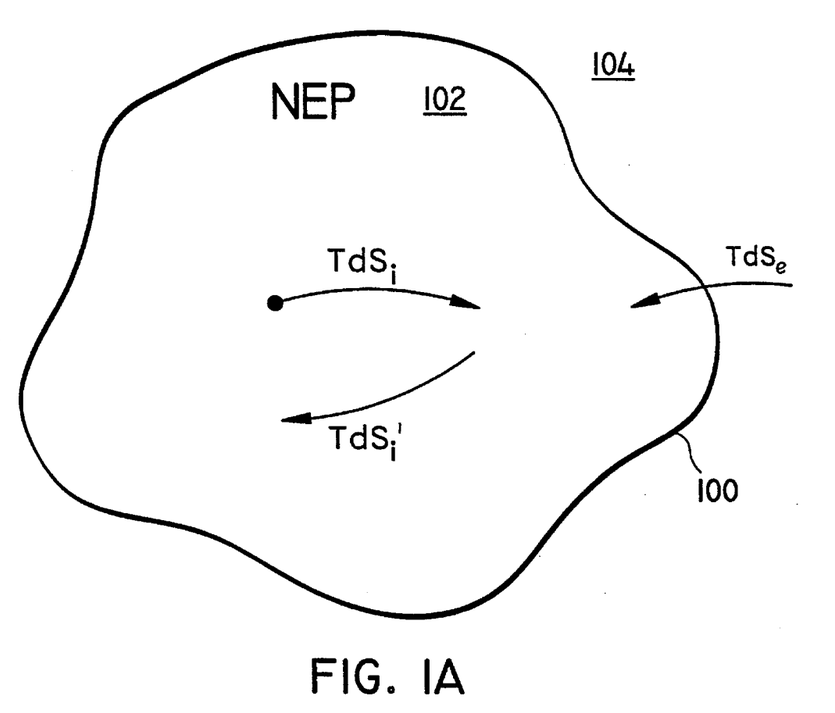
FIG. 1a is a representative drawing of the energy flows associated with a system.

This process may be analyzed in more specific terms for non-equilibrium processes, such as that involved in the present invention, by reference to FIG. 1a. A non-equilibrium process ("NEP") is defined generally as any process that may be arbitrarily considered as a system having energy state E, where there is a net change in the internal energy of the system. A non-equilibrium process may be modelled as occurring within a boundary 100 comprising a thermodynamic system 102. The change in energy state of the system 102 may be described by the equation:

$$dE=TdS_i-TdS_i'+TdS_c-pdV.$$

where
  T is the temperature of the system 102,
  $dS_i$ is the change of entropy caused by the excitation and breakdown of internal ties of elements of the system 102,
  $dS_i'$ is the change in entropy caused by the formation of new internal ties of elements of the system 102,
  $dS_c$ is the change in entropy in the external environment 104 caused by the non-equilibrium process, and
  pdV is the work done on the external environment 104 at the boundary 100 of the system 102.

Thus, $$dQ=(TdS_i-TdS_i')+TdS_c,$$

so
  $TdS_i$ is the heat emitted within the boundary 100 of the system 102 from the excitation and breakdown of internal ties of elements of the system 102,
  $TdS_i'$ is the heat used within the boundary 100 of the system 102 by the formation of new internal ties of elements of the system 102, and
  $TdS_c$ is the heat flow across the boundary 100 of the system 102 into the system from the environment 104.

The various heat flows described above are representatively shown in FIG. 1a. It is seen that an increase in internal energy of the system 102 due to a non-equilibrium process thus involves a flow of heat from the environment 104 into the system 102.

The above analysis may be used to suggest a principle of operation of the system of FIG. 1. If the LNEP 12, a non-equilibrium process, is conceived as part of a system, such as that of FIG. 1a, then the increase in internal energy of the system by the LNEP will create a flow of heat from the surrounding environment into the system. If an energy sensor, such as sensor 14a, is sufficiently close to the LNEP 12 to be "within" the system, it will reflect an increase in internal energy of the system (i.e., give an indicia of increase in temperature or energy state).

On the other hand, if an energy sensor, such as sensor 14b, is sufficiently far from the LNEP 12 to be "outside" the system, then it will reflect the decrease in internal energy of the environment surrounding the system (i.e., give an indicia of decrease in temperature or energy state) during the LNEP 12. (Generally, the LNEP 12 is referred to as a "local" non-equilibrium process because its affect on the energy state of the surrounding environment is measurable on the order of meters from the LNEP 12, or even less than a meter. (This region is known as the "local environment" of the LNEP 12.) More generally, the amounts of energy in an LNEP 12 are many orders of magnitude less than the energy involved in a catastrophic event, as described below.)

Where the LNEP 12 may be reproduced in a controlled manner, the change in the energy or temperature observed at the sensors 14a, 14b over the interval of the LNEP 12 will likewise be reproduced.

If there is an impending catastrophic event, such as a earthquake, then for the usual case where the entire experimental station 10 lies "outside" a system that includes the catastrophic event (a large non-equilibrium process), both energy sensors of FIG. 1 would reflect a decrease in internal energy as energy flows from the environment into the system enveloping the catastrophic event. If the measuring station 10 is sufficiently close to the impending event, then the decrease in internal energy in the environment at the measuring station 10 caused by the catastrophic event will dominate changes in internal energy at the energy sensors 14a, 14b caused by the LNEP 12. Thus, the change in energy or temperature observed at the sensors 14a, 14b over the interval of the LNEP 12 will change, giving an indicia of the impending catastrophic event.

Referring back to FIG. 1, the LNEP 12 may include, for example, samples of either sandstone, granite or marble in a cylinder of diameter approximately 40 mm and approximately 80 mm in length that is subjected to a hydraulic press increased from 0 to 10 tons and then decreased from 10 tons to 0 over a two minute interval. The energy sensors 14a, 14b (or, more particularly, the sensing element of the sensors, such as the thermistors in the energy sensing circuits described below) are placed at distances $r_1$, $r_2$ of approximately 100 mm and 800 mm, respectively, from the LNEP 12.

Figure 2:
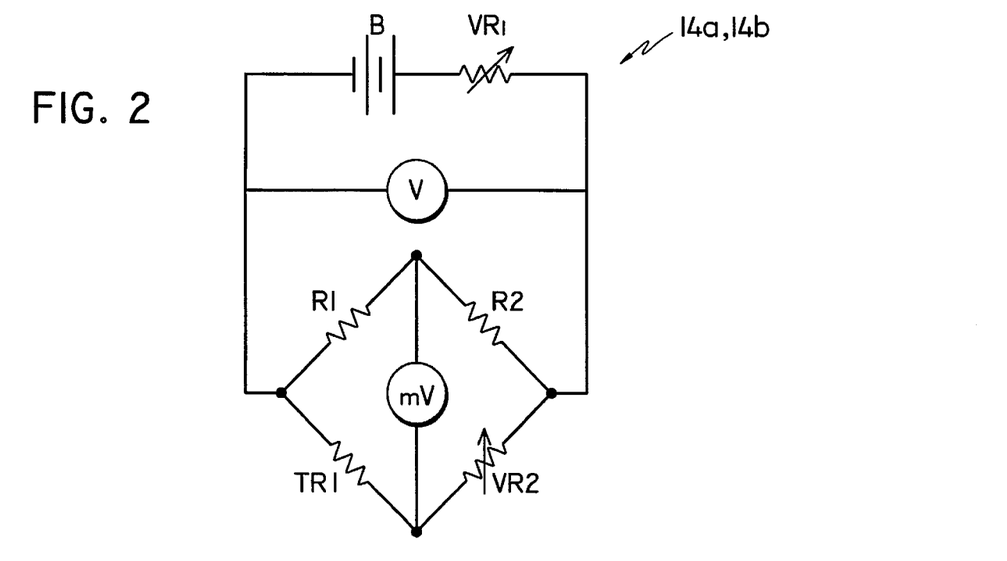
FIG. 2 is a circuit diagram of an energy sensor of the present invention.

The energy sensors 14a, 14b may be constant current bridge circuits, such as the bridge circuit shown in FIG. 2. Thermistor TR is in series with variable resistor VR2 and comprise one leg of the bridge. Resistors R1 and R2 are also in series and comprise the second leg of the bridge. A millivoltmeter mV measures the difference in voltage drop across R2 and VR2. The bridge is connected in series with battery B and variable resistor VR1. A voltmeter V measures the voltage across the bridge.

Resistors R1 and R2 may be 5 KΩ each, and variable resistor VR2 may vary between zero and 10 KΩ, and may be set to 5 KΩ. Thermistor TR has a nominal resistance (i.e., resistance at the beginning of an LNEP) of 5 KΩ and an energy sensitivity G of $5 \cdot 10^4$ Joules per percent change from its nominal value. (This parameter is known to those skilled in the art; if not provided by the manufacturer of a particular thermistor, it may be determined experimentally in conjunction with a calorimeter, by measuring the change in resistance from its nominal value per energy change e in the calorimeter. G is determined by the equation:

$$G = \frac{R \cdot e}{\Delta R \cdot 100\%}$$

where R is the nominal resistance and $\Delta R$ is the change in resistivity from its nominal value.) Battery B has a voltage of approximately 5 volts, and variable resistor VR1 varies between zero and 25 KΩ, and is set at approximately 20 KΩ.

When the millivoltmeter mV has a zero reading, it indicates that the bridge is in "balance." When the bridge is balanced, the voltage drop across R1 and TR is equivalent, and the voltage drop across R2 and VR2 is equivalent. When the bridge is in balance and resistors R1 and R2 have equal resistance, as described for the circuit above, then the resistance of thermistor TR equals the resistance setting of variable resistor VR2. Thus, when the resistance value of TR changes due to a change in temperature, then variable resistor VR2 may be adjusted so that the millivoltmeter is zero (i.e., the bridge is balanced), and the value of TR is determined by the value of VR2. Similarly, the change in resistance of TR is equal to the change made to the resistance of variable resistor VR2.

Figure 3:
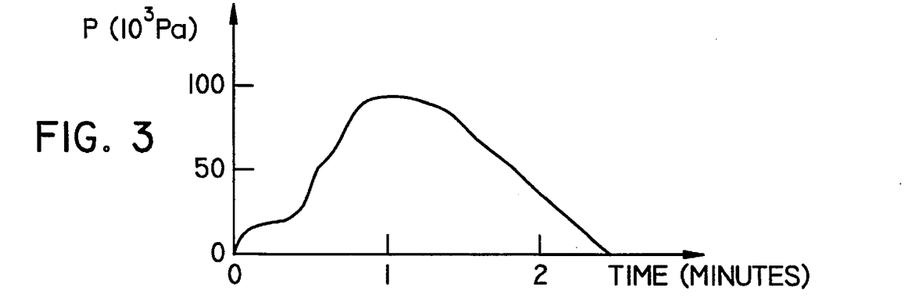
FIG. 3 is a graph of applied pressure versus time for a local non-equilibrium process of a measuring station of FIG. 1.

An LNEP 12 consisting of a press acting on a cylinder of sand, such as that described above, may have a pressure versus time profile as shown in FIG. 3. As shown in FIG. 3, the pressure of the LNEP 12 increases from zero to approximately $10^{+5}$ Pa in the first minute and then decreases to zero in the next minute.

During the LNEP 12 described above and shown in FIG. 3, the resistance of thermistor TR of the energy sensors 14a, 14b may vary from their initial values by 20 Ω (as measured by the change in resistance of variable resistor VR2 in order to maintain the millivoltmeter zero balanced). The energy state e of the immediate environment of each energy sensor 14a, 14b during the LNEP 12 is measured with respect to the nominal energy state, arbitrarily set to zero. (The nominal energy state is the energy state of the environment at the energy sensor at the beginning of an LNEP.) The energy state e is related to the change in resistance of the thermistor TR by the equation:

$$e = G \cdot \frac{\Delta R}{R} \cdot 100\%$$

where

G is the energy sensitivity of the thermistor of the sensor 14a, 14b, $\Delta R$ is the change in resistance of the thermistor, and R is the nominal resistance of the thermistor, i.e., the resistance of the thermistor at the nominal energy state (e=0).

Thus, the energy state of the environment adjacent the energy sensors 14a, 14b may be calculated and plotted over the LNEP 12 using the measured change in resistance of the thermistor TR. (As previously noted, the change in resistance of thermistor TR will be equal to the change in the resistance of variable resistor VR2 when the bridge is balanced.) The energy state of the local environment is shown in FIG. 4 at the energy sensors 14a, 14b over the LNEP 12.

Figure 4:
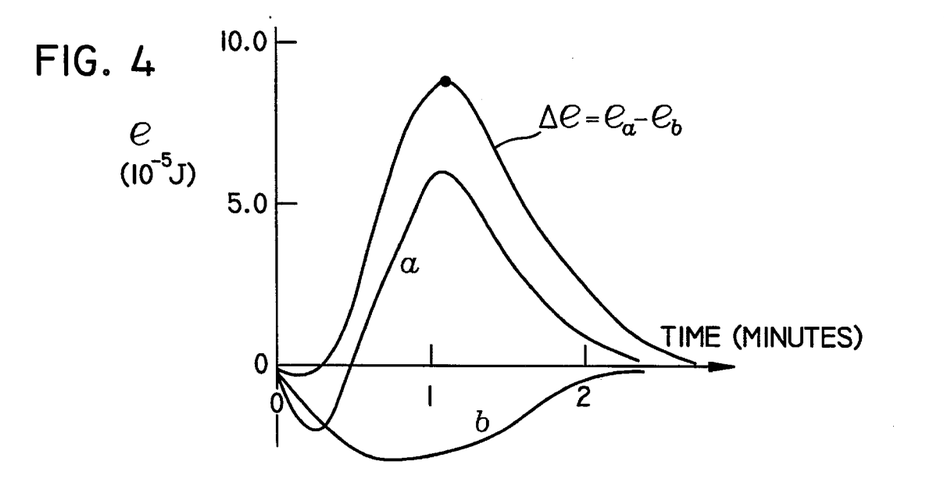
FIG. 4 is a graph showing the energy state at the sensors of a measuring station of FIG. 1, and the change in energy state between the sensors, during a local non-equilibrium process.

Curve a of FIG. 4 is the energy at energy sensor 14a over the LNEP 12, and curve b of FIG. 4 is the energy measured at energy sensor 14b over the LNEP 12. It is seen that the environment adjacent energy sensor 14a is initially "outside" the system enveloping the LNEP 12 and thus, there is initially a decrease of environmental energy, as it flows into the system. Energy sensor 14a, however, is sufficiently close to the press so that it becomes enveloped in the system, and its energy state is seen to increase shortly after the LNEP 12 begins. Energy sensor 14b is never within the system that envelops the LNEP 12, and thus displays a decrease in internal energy over the entire LNEP 12.

The environmental energy "profiles" generated by energy sensors 14a, 14b shown in FIG. 4 will be repeated each time the LNEP 12 of FIG. 3 is generated. (This is referred to as an "LNEP cycle" hereinafter.) The difference in environmental energy at sensor 14a and sensor 14b will also be the same for each LNEP cycle, and is shown in FIG. 4 as the curve labelled Δe.

Figure 5:
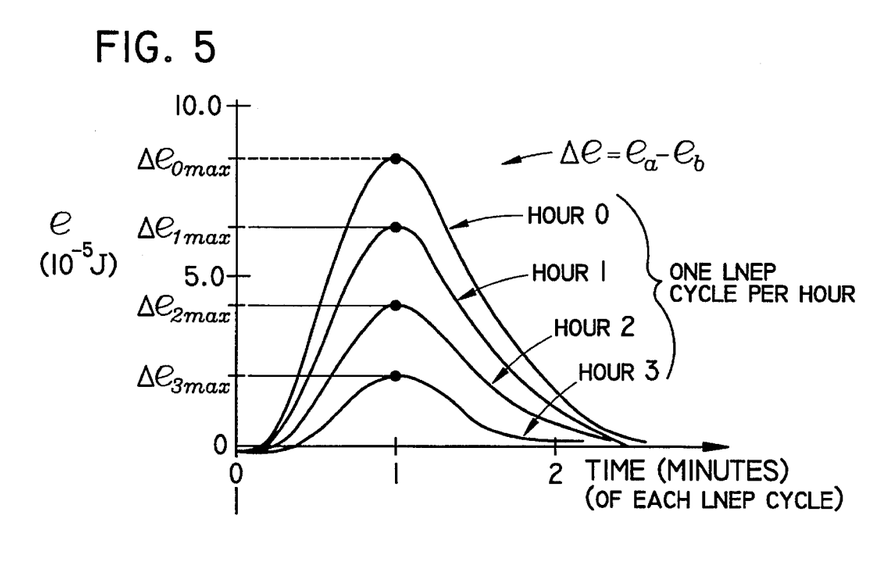
FIG. 5 is a graph showing how the energy state between the sensors of the measuring station of FIG. 1 is expected to change during local non-equilibrium processes separated by an hour, where there is an impending catastrophic event.

A pending catastrophic event is a non-equilibrium process that vastly exceeds the LNEP 12. It will normally be sufficiently far from a measuring station 10 of FIG. 1 so that the environment at the measuring station is outside the system enveloping the catastrophic event. Accordingly, energy from the environment at the measuring station 10 will flow into the system enveloping the catastrophic event. Thus, the environmental energy measured at the thermistors of energy sensors 14a, 14b, and the change in environmental energy, Δe, for an LNEP 12 cycle will decrease. FIG. 5 represents how the curve showing the difference in environmental energy at sensor 14a and sensor 14b would decrease for LNEP cycles taken over a series of hourly intervals because of the influence of a catastrophic event.

Figure 6:
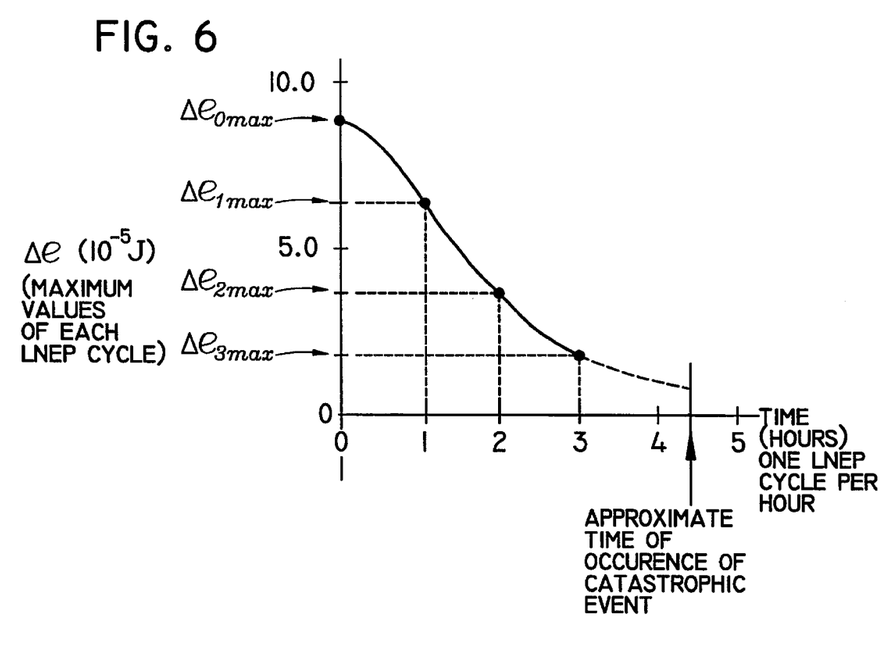
FIG. 6 is a graph showing the maximum change in energy state between the sensors of FIG. 5 during successive local non-equilibrium processes, where there is an impending catastrophic event.

The catastrophic event will occur approximately at the time when the energy state of the environment surrounding the system enveloping the catastrophic event is at its lowest. This may be determined before the event occurs by projecting when the decrease in Δe will be at its minimum. If the values of the maximum magnitude of Δe in FIG. 5 are plotted versus the time of the LNEP cycle, as shown in FIG. 6, then the projected minimum value of Δe will be the approximate time of occurrence of the catastrophic event. This is shown to be approximately 4 to 5 hours from time t=0 in FIG. 6.

While FIGS. 5 and 6 have been shown graphically, in practice, the indicia of energy measured at each energy sensor, such as the change in resistance of each thermistor of the energy sensor of FIG. 2, would be inputted into a monitoring system that interfaces with a computer. LNEP cycles would be generated periodically, and the monitoring system and computer would generate a maximum value of Δe for the particular LNEP cycle. The monitoring system would maintain maximum values of Δe for past LNEP cycles and compare them, together with the current value. If a decrease in the maximum value of Δe were detected, the monitoring system and computer would calculate a projection of when the catastrophic event would occur from the rate of change of past and current values of Δe, as is done graphically in FIG. 6. In order to refine the estimate of the catastrophic occurrence, once a decrease in maximum Δe was detected, the frequency of the LNEP cycles could also be increased.

Also, the change in resistance of the thermistor TR of FIG. 2 is a function of the change in resistance of VR2 when the bridge is in balance (or, equivalent, the millivoltmeter mV is zeroed). In the above case, where resistance of R1 equals the resistance of R2, the change in resistance of TR is equal to the change in resistance of VR2 when the bridge is balanced. The variable resistor VR2 and the millivoltmeter mV may be electronically linked so that the value of the variable resistor is adjusted to keep the millivoltmeter zeroed, and the bridge remains balanced.

It should be noted that the change in energy does not have to be used in the above-described graphs and determinations. The changes in resistance of the thermistors, proportional to the changes in energy, may be used directly. Thus, in FIGS. 4–6, the vertical axis of the graphs could be change in resistance, and the shape of each graph would be the same. The same indicia of a pending catastrophic event would be given, and the same forecast of the time of the event.

Figure 6A:
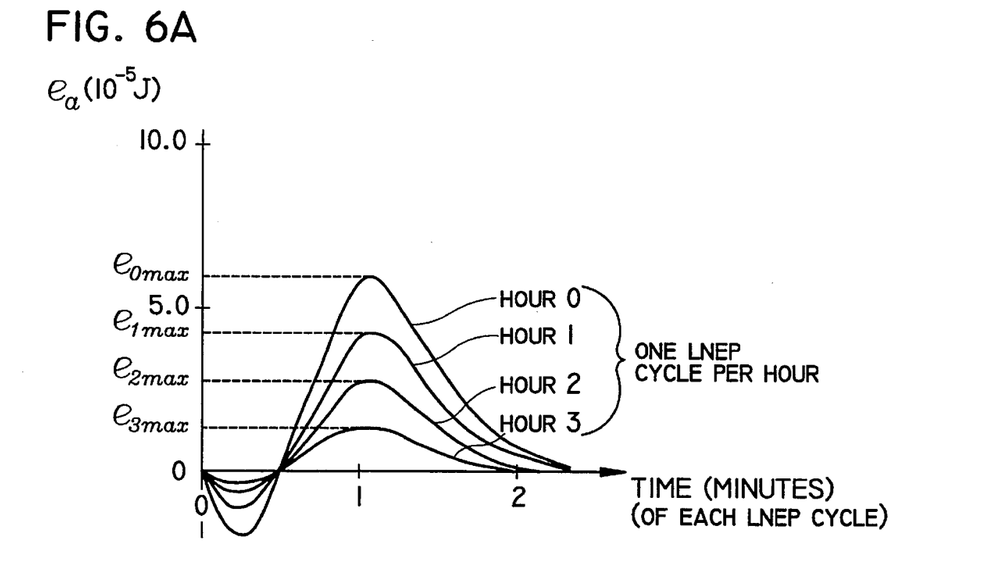
FIG. 6a is a graph showing how the energy state at a sensor of the measuring station of FIG. 1 is expected to change during local non-equilibrium processes separated by an hour, where there is an impending catastrophic event.
Figure 6B:
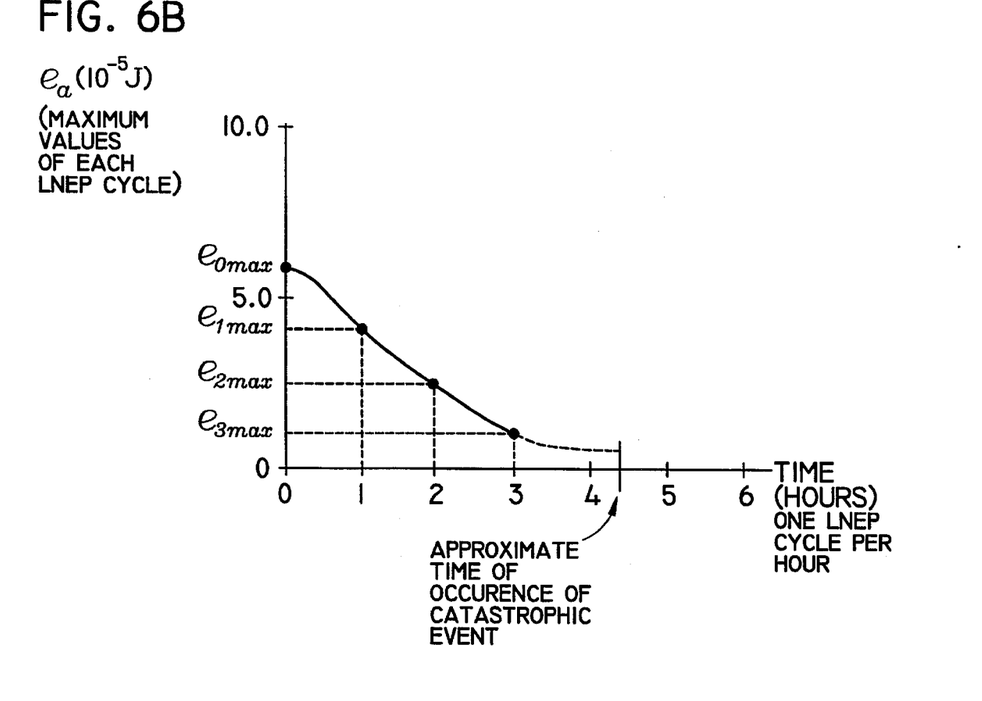
FIG. 6b is a graph showing the maximum change in energy state at the sensor of FIG. 6a during successive local non-equilibrium processes, where there is an impending catastrophic event.
Figure 6C:
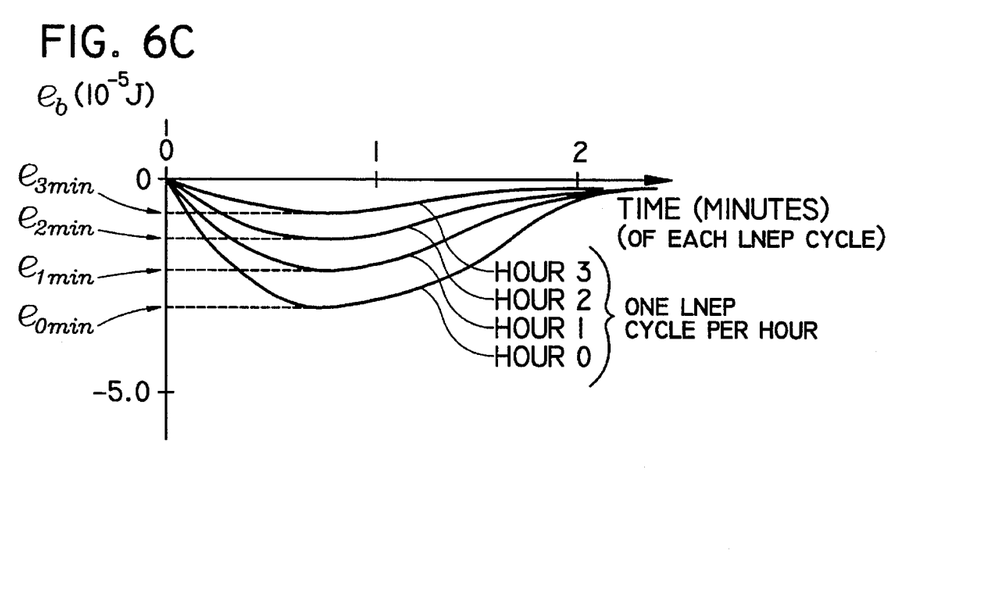
FIG. 6c is a graph showing how the energy state at a sensor of the measuring station of FIG. 1 is expected to change during local non-equilibrium processes separated by an hour, where there is an impending catastrophic event.
Figure 6D:
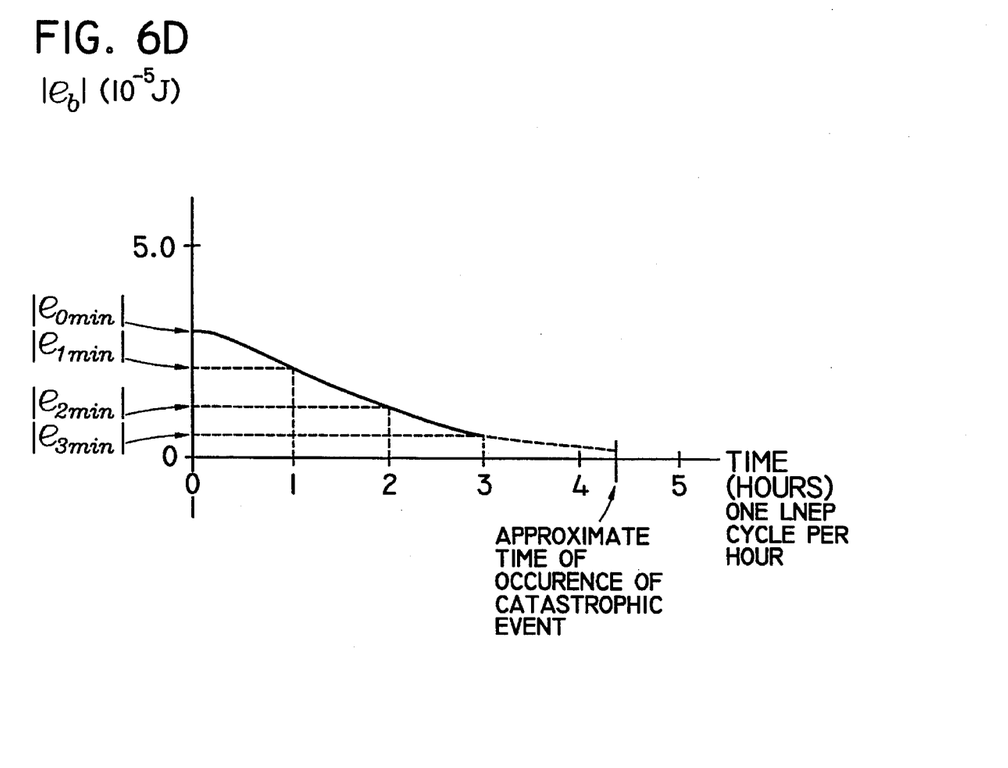
FIG. 6d is a graph showing the maximum change in energy state magnitude at the sensor of FIG. 6c during successive local non-equilibrium processes, where there is an impending catastrophic event.

Similarly, using the difference in changes of energy state (or the differences in change in resistance of the thermistors for a sensor such as that in FIG. 2) between energy sensors 14a, 14b, as was done in FIGS. 4–6, is not required. The change in energy (or change in resistance of the thermistor) at each energy sensor, such as curve a or curve b of FIG. 4, will decrease in magnitude for successive LNEP cycles if there is an impending catastrophic event. A graph, such as that in FIG. 6, may be generated using the maximum magnitude of the change in energy for each LNEP cycle for a single energy sensor, and used to forecast the time of the event. This is shown in FIGS. 6a–6b for energy sensor 14a and in FIGS. 6c–6d for energy sensor 14b (where the absolute value of the minimum value of e during the LNEP cycle determines the maximum magnitude). (It should also be noted that the maximum magnitude of change in energy is used for each LNEP cycle in order to facilitate observation of the changes. However, comparisons may be made of energy at other times during the LNEP cycle, provided they are all made at the same time of the cycle.)

Figure 7:
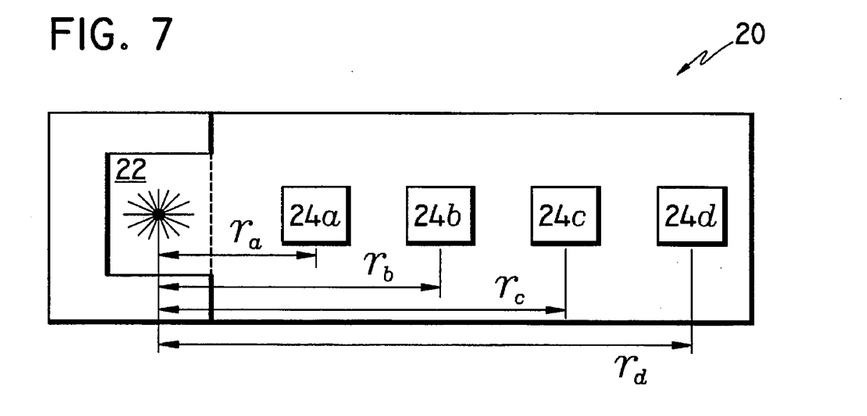
FIG. 7 is a representative drawing of a measuring station of the present invention.

FIG. 7 shows an experimental station 20 with LNEP 22 and four energy sensors 24a, 24b, 24c, 24d. The LNEP 22 is the same as described above with respect to FIG. 1, and the energy sensors 24a, 24b, 24c, 24d may be comprised of bridge circuits as described with respect to FIG. 2 above. The distances $r_a$, $r_b$, $r_c$ and $r_d$ of FIG. 1 are approximately 100 mm, 200 mm, 400 mm and 800 mm, respectively. (As previously noted, these are the distances of the thermistors of the bridge circuits of each energy sensor from the LNEP.) Re-referring to the equation described above, the energy state at each energy sensor 24a, 24b, 24c, 24d is given by:

$$e = G \cdot \frac{\Delta R}{R} \cdot 100\%$$

For a thermistor, $$\Delta R = \frac{\alpha \cdot R \cdot \Delta T}{100\%}$$

where α0 is the percentage change of resistance of a thermistor from its nominal value per unit change in temperature. (As with the parameter G above, α is known to those skilled in the art. If not provided by the manufacturer of a particular thermistor, it can be measured experimentally by placing the thermistor in a calorimeter and measuring the change in resistance versus a change in temperature.) Combining the above equations, $$e = G \cdot \alpha \cdot \Delta T$$

Accordingly, the energy state at each sensor 24a, 24b, 24c, 24d is proportional to the change in temperature.

Where the energy sensors 24a, 24b, 24c, 24d are comprised of the bridge circuit of FIG. 2, the change in temperature at each sensor is calculated from the measured value of the change in resistance of the thermistor TR by the equation:

$$\Delta T = \frac{\Delta R}{R} \cdot \frac{100\%}{\alpha}$$

The changes in temperature measured at each energy sensor 24a, 24b, 24c and 24d will therefore vary proportionally with the change in resistance of the thermistor of the energy sensor, as described above, and as shown graphically in FIG. 8 over the LNEP 22. Curves a, b, c and d of FIG. 8 correspond to the temperature changes (with respect to the initial temperature $T_o$) at energy sensors 24a, 24b, 24c and 24d, respectively, over the LNEP 22 as calculated from the measured changes in resistivity of the thermistors.

Figure 8:
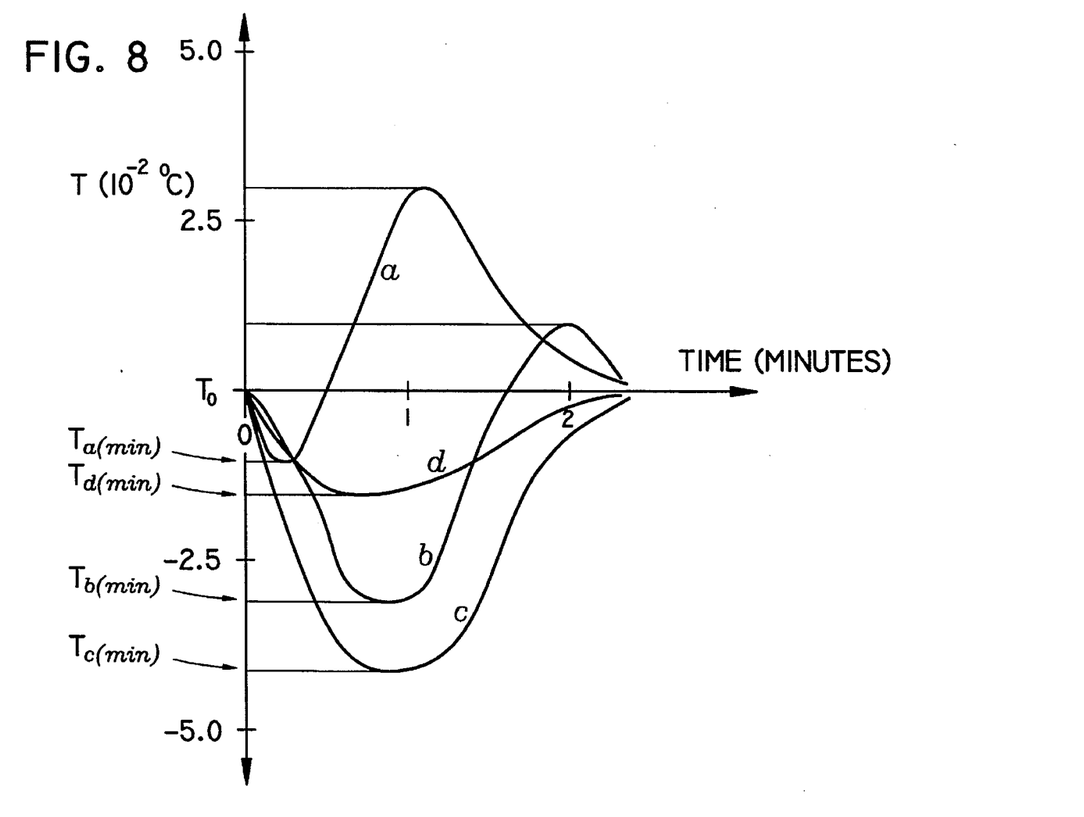
FIG. 8 is a graph of change in temperature versus time at the various sensors of a measuring station of FIG. 7 during a local non-equilibrium process.
Figure 9:
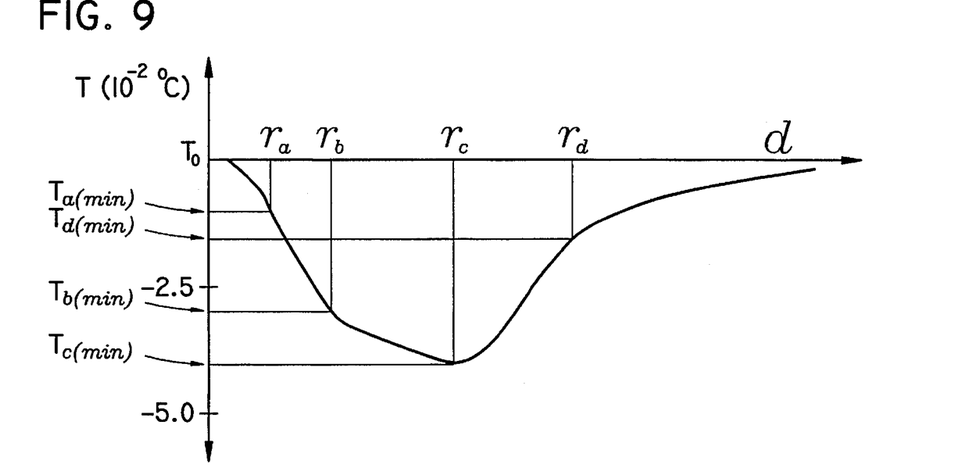
FIG. 9 is a graph of the maximum negative change in temperature observed at the various sensors of a measuring station of FIG. 7 during a local non-equilibrium process.

The maximum negative changes in temperature $T_{a(min)}$, $T_{b(min)}$, $T_{c(min)}$, $T_{d(min)}$ (also referred to as the "minimum changes in temperature") during an LNEP cycle at the energy sensors 24a, 24b, 24c, 24d, such as that shown in FIG. 8, are shown graphically in FIG. 9 as a function of the distances $r_a$, $r_b$, $r_c$, $r_d$ from the LNEP 12. This "profile" of the minimum changes in temperature versus distance will be repeated for each LNEP 22, if there is no influence on the energy state of the local environment beyond the LNEP 22. The difference in the minimum changes in temperature between two adjacent sensors is proportional to the difference in minimum energy of the environment adjacent the sensors during the LNEP 22.

Figure 10:
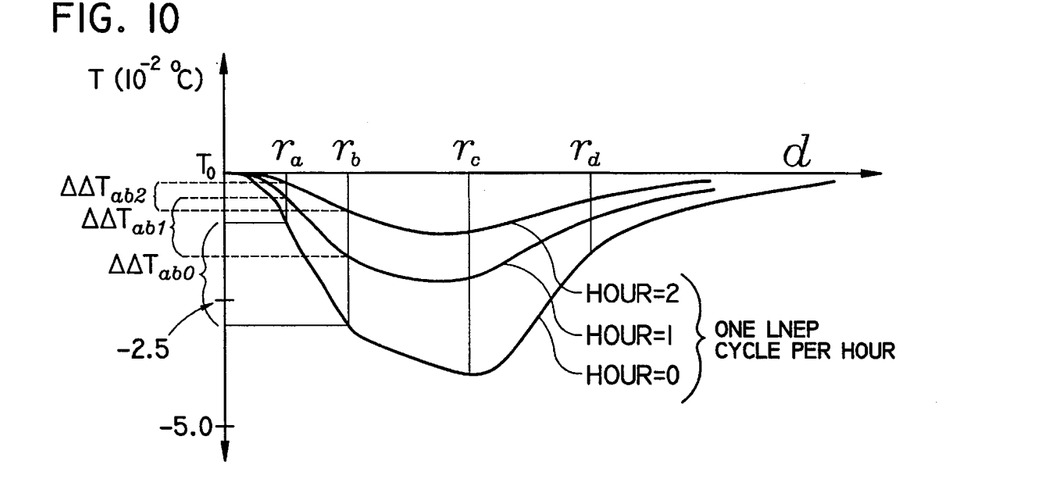
FIG. 10 is a graph of how the maximum negative change in temperature observed at various sensors is expected to change during successive local non-equilibrium processes when there is an impending catastrophic event.

Should a catastrophic event influence the environmental energy state at the station 20, then, as described above, energy from the environment at the measuring station 20 will flow into the system enveloping the catastrophic event. Thus, the changes in temperature measured at sensors 24a, 24b, 24c, 24d will decrease (in absolute value) for an LNEP 12 cycle. FIG. 10 represents how the curve showing the minimum changes in temperature at sensors 24a, 24b, 24c, 24d would decrease in magnitude for LNEP cycles taken over a series of hourly intervals because of the influence of a catastrophic event.

Figure 11:
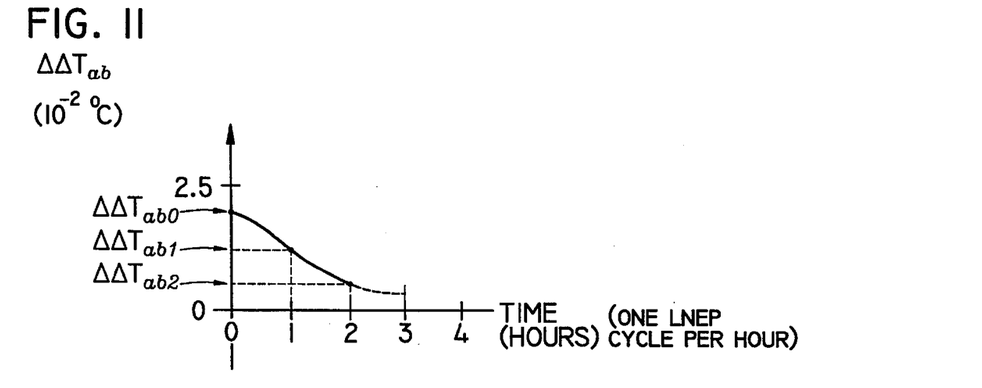
FIG. 11 is a graph showing the maximum change in temperature state between two adjacent sensors of FIG. 10 during successive local non-equilibrium processes, where there is an impending catastrophic event.

FIG. 10 indicates that, where there is an impending catastrophic event, the difference in the minimum change of temperature between two adjacent sensors would likewise decrease in magnitude. Thus, for example, the difference in changes of minimum temperature between sensors 22a and 22b over the three LNEP cycles (each separated by an hour in time) of FIG. 10 is shown to be $\Delta\Delta T_{ab0}$, $\Delta\Delta T_{ab1}$, and $\Delta\Delta T_{ab2}$, and $\Delta\Delta T_{ab0} > \Delta\Delta T_{ab1} > \Delta\Delta T_{ab2}$. The difference in minimum change in temperature for these sensors is shown in FIG. 11 as a function of the time the LNEP 22 cycle is generated. The catastrophic event will occur approximately at the time when the difference in the minimum change of temperature for adjacent sensors is at its minimum. As shown in FIG. 11, the projection of the difference of minimum change of temperature may be made to provide an approximate time of the catastrophic event. (In FIG. 11, the catastrophic event would occur at a time Z of approximately 3 hours after t=0.)

In practice, the change in resistance versus time for the thermistor in the bridge circuit (as measured by the change in resistance of the variable resistor for a balanced circuit) for each energy sensor 24a, 24b, 24c, 24d would be inputted into a monitoring system that interfaces with a computer. LNEP cycles would be generated periodically, and the monitoring system and computer would generate a minimum change in temperature for the sensor for the particular LNEP cycle based on the received resistance data. The monitoring system would maintain minimum values of changes in temperature at the sensors for past LNEP cycles and compare them, together with the current value. Alternatively, the monitoring system would compute differences in the minimum changes in temperature between one or more pairs of adjacent sensors. If a decrease in the differences in the minimum change in temperature were detected between adjacent stations, the monitoring system and computer would calculate a projection of when the catastrophic event will occur from the rate of change of past and present values of differences in the minimum change in temperature between adjacent stations. In order to refine the estimate of the occurrence, once a change was detected, the frequency of the LNEP cycles could also be increased.

Because the changes in temperature of the sensors are proportional to the changes in resistance of the thermistors, the measured changes in resistance of the thermistors may be used directly in the process described above. Where the energy sensors are the bridge circuits of FIG. 2, the change in resistance of the thermistor is, as noted above, equal to the change in resistance of the variable resistor of the bridge circuit when the circuit is balanced.

Figure 12:
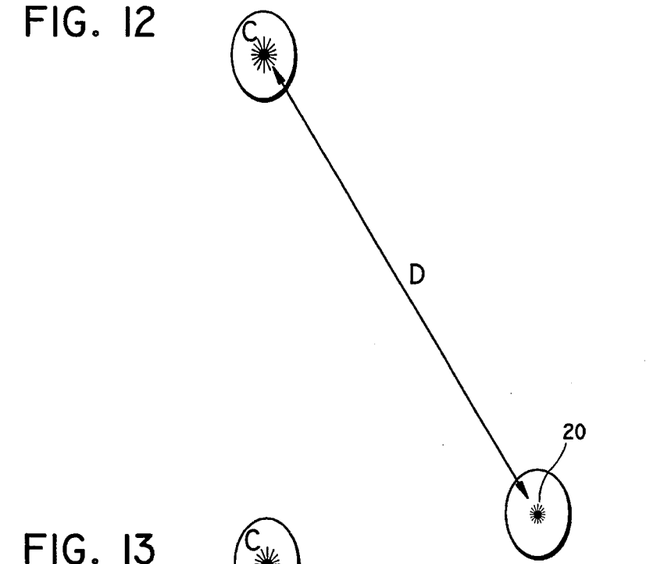
FIG. 12 is a pictorial representation of a measuring station located a distance D from an impending catastrophic event.

A network of stations may be used to determine the energy E and location of the impending catastrophic event. FIG. 12 shows the particular station 20 of FIG. 7 located a distance D from the site of the catastrophic event, C, where D is much greater than the distances $r_a$, $r_b$, $r_c$ and $r_d$ in FIG. 7. As noted above, the energy state e at one of the energy sensors of the station 20 during an LNEP 22 is determined by the formula $$e = G \cdot \alpha \cdot \Delta T$$

where $\Delta T$ may be the minimum change in temperature during an LNEP 22 cycle. The change in energy state at the particular sensor that may be caused by a catastrophic event is thus:

$$\Delta e = G \cdot \alpha \cdot \Delta\Delta T$$

where $\Delta\Delta T$ is the difference in minimum change in temperature at the particular sensor. The change in the energy state of the station 20 caused by the energy E of the impending catastrophic event is also given as $$\Delta e = \frac{E \cdot X}{4\pi D^2}$$

where X is the cross-sectional area of the energy sensing element of the particular energy sensor used (a thermistor for the energy sensors of FIG. 2), and D is the distance between the site of the impending catastrophic event and the station 20, as shown in FIG. 12. Thus, the energy E may be calculated as:

$$E = G \cdot \alpha \cdot \frac{\Delta\Delta T}{X} \cdot (4\pi D^2)$$

Figure 13:
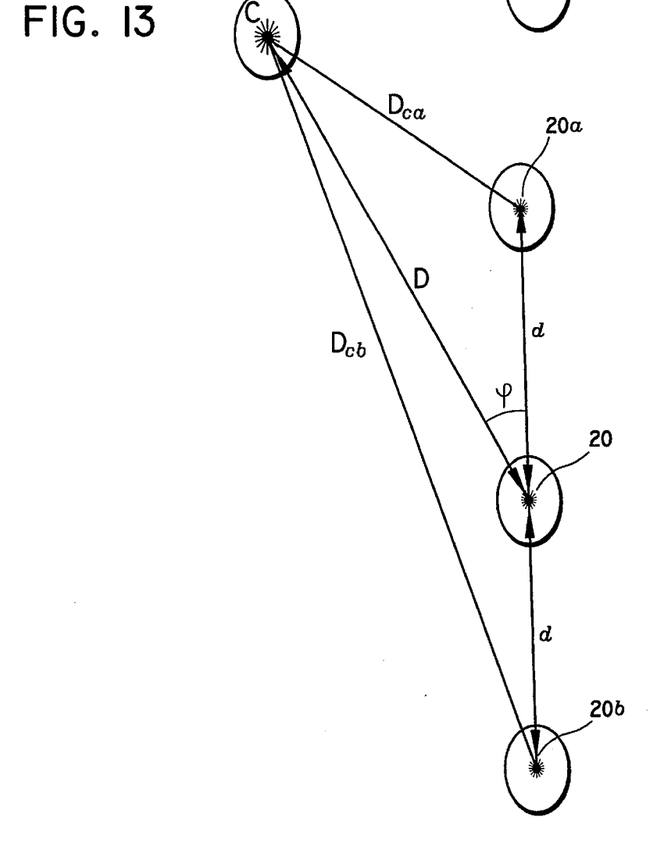
FIG. 13 is a pictorial representation of three measuring stations located at various distances from an impending catastrophic event.

To determine the site of the impending catastrophic event, including the distance D of the catastrophic event from a particular station, a network of experimental measuring stations are used as shown in FIG. 13. The station 20 of FIG. 13 is located a distance d from a second and third stations 20a, 20b, which also have LNEPs and energy sensors. The stations 20, 20a, 20b all lie approximately in a line in FIG. 13. (Distance d will normally be sufficiently large so that the LNEP generated by each station is not detectable by the energy sensors of the other stations.) A change in the energy state at a particular sensor during an LNEP by a catastrophic event is given by:

$$\Delta e_a = G \cdot \alpha_a \cdot \Delta\Delta T_a$$

$$\Delta e_b = G \cdot \alpha_b \cdot \Delta\Delta T_b$$

where the subscript a refers to parameters relating to the sensor at station 20a and the subscript b refers to parameters relating to the sensor at station 20b. Similarly, $$\Delta e_a = \frac{E \cdot X_a}{4\pi D_{ca}^2}$$

$$\Delta e_b = \frac{E \cdot X_b}{4\pi D_{cb}^2}$$

where $X_a$ is the cross-section of the particular sensing element of the energy sensor at station 20a, $X_b$ is the cross-section of the sensing element of the energy sensor at station 20b, $D_{ca}$ is the distance between station 20a and catastrophic event C, and $D_{cb}$ is the distance between station 20b and catastrophic event C, as shown in FIG. 13. Equivalently, $$\Delta e_a = \frac{E \cdot X_a}{4\pi(D^2 + d^2 - 2Dd\cos\phi)}$$

$$\Delta e_b = \frac{E \cdot X_b}{4\pi(D^2 + d^2 + 2Dd\cos\phi)}$$

where d is the distance between station 20 and station 20a, which is equivalent to the distance between station 20 and station 20b. Using the previously derived formula for the internal energy corresponding to station 20, $$\Delta e = \frac{E \cdot X}{4\pi D^2}$$

the last three equations may be solved for the two parameters D and $\phi$ (shown in FIG. 13 to give an angular reference parameter for the impending catastrophic event), which give the distance and direction of the site of the catastrophic event with respect to station 20. Presuming the cross-sections X, $X_a$, $X_b$ of the sensing elements of the energy sensors of stations 20, 20a, 20b are equivalent:

$$D = d\left(\frac{2\Delta e_a e_b}{\Delta e(\Delta e_a + \Delta e_b) - 2\Delta e_a e_b}\right)^{1/2}$$

$$= d\left(\frac{2\Delta\Delta T_a\Delta\Delta T_b}{\Delta\Delta T(\Delta\Delta T_a + \Delta\Delta T_b) - 2\Delta\Delta T_a\Delta\Delta T_b}\right)^{1/2}$$

$$\phi = \arccos\left(\frac{\Delta e(\Delta e_a - \Delta e_b)}{2(2\Delta e\Delta e_a\Delta e_b(\Delta e_a + \Delta e_b) - 4\Delta e_a^2\Delta e_b^2)^{1/2}}\right)$$

$$= \arccos\left(\frac{\Delta\Delta T(\Delta\Delta T_a - \Delta\Delta T_b)}{2(2\Delta\Delta T\Delta\Delta T_a\Delta\Delta T_b(\Delta\Delta T_a + \Delta\Delta T_b) - 4\Delta\Delta T_a^2\Delta\Delta T_b^2)^{1/2}}\right)$$

Once D is solved, the energy E of the impending catastrophic event may be calculated from the prior formula:

$$E = \frac{4\pi D^2 \Delta e}{X} = \frac{4\pi D^2}{X} \cdot G \cdot \alpha \frac{\Delta\Delta T}{R}$$

The network of stations, of course, may interface with a monitoring means and computing means that compiles changes in temperature (for example, as converted from the changes in resistance of the thermistors of the bridge circuits of FIG. 2, when they are used as the energy sensors of the stations) during each station's LNEP cycle. The differences in change in temperature for successive LNEP cycles as detected at each station's energy sensor may be used in the above formulas to determine the energy E of the impending catastrophic event, the distance D of the catastrophic event from a particular station 20 of the network, and the angle of direction $\phi$ of the catastrophic event with respect to the station 20.

Where the energy sensors of the various stations in the network consist of bridge circuits as in FIG. 2, then the energy sensing element is the thermistor and the change in temperature is related to the change in resistance of the thermistor by the formula described above:

$$\Delta R = \frac{\alpha \cdot R \cdot \Delta T}{100\%}$$

Where the thermistors of each station 20, 20a, 20b are the same, i.e., have the same cross-sectional area and the same values for the parameters G and $\alpha$, then the differences in changes in resistance of the thermistors of the energy sensors at each station, $\Delta\Delta R$, $\Delta\Delta R_a$, $\Delta\Delta R_b$, may be substituted for the differences in changes in temperature:

$$D = d\left(\frac{2\Delta\Delta R_a\Delta\Delta R_b}{\Delta\Delta R(\Delta\Delta R_a + \Delta\Delta R_b) - 2\Delta\Delta R_a\Delta\Delta R_b}\right)^{1/2}$$

$$\phi = \arccos\left(\frac{\Delta\Delta R(\Delta\Delta R_a - \Delta\Delta R_b)}{2(2\Delta\Delta R\Delta\Delta R_a\Delta\Delta R_b(\Delta\Delta R_a + \Delta\Delta R_b) - 4\Delta\Delta R_a^2\Delta\Delta R_b^2)^{1/2}}\right),$$

and $$E = \frac{4\pi D^2}{X} = \frac{G \cdot \Delta\Delta R}{R} \cdot 100\%$$

Where the network of stations interfaces with a monitoring means and computing means, as described above, to determine the distance D and the angle $\alpha$, then changes in the resistance of the thermistors of the energy sensors of the stations (as measured by the changes in resistance of the variable resistor of the balanced bridge circuit) are compiled directly, and differences in change in the resistance of the thermistors may be used in the above formulas to determine E, D and $\phi$.

It will be understood that various modifications can be made to the various embodiments and steps of the present invention herein disclosed without departing from its spirit and scope. For example, for the measuring stations, various types of energy sensors are contemplated, as well as various types of local non-equilibrium processes. Also, various modifications may be made in the way the changes in energy near the local non-equilibrium processes are measured and compared. (In the description above, for example, energy measurements of individual sensors and were compared, and differences in energy measurements between two sensors were also compared.) Similarly, various modifications may be made to the above-described sequence of the invention without departing from its spirit and scope. For example, for a station with multiple sensors, the energy measurements may be made by only one sensor, until a change in energy of sufficient magnitude is detected during successive LNEP processes. When that threshold is passed, additional sensors in the station may begin measuring the changes in energy in the local environment, in order to give a more precise measurement of when the impending catastrophic event will occur. Similarly, the generation of the LNEP process may occur more frequently when the change in energy state passes a threshold. Therefore, the above description should not be construed as limiting the invention, but merely as presenting preferred embodiments of the invention. Those skilled in the art will envision other modifications within the scope and spirit of the present invention as defined by the claims presented below.

What is claimed is:

1. A system for forecasting catastrophic events, comprising:
   a) at least one measuring station having:
      i) means for generating a reproducible non-equilibrium process within a local environment having a detectable energy state at a given time; and
      ii) means for measuring an indicia of the detectable energy state of a portion of the local environment simultaneous with the generation of the reproducible non-equilibrium process, and
   b) means for determining when the indicia of the energy state of a portion of the local environment will be at a minimum,
   whereby the determination of when the indicia of the energy state of a portion of the local environment will be at a minimum gives an approximate time of occurrence of the catastrophic event.

2. System for forecasting catastrophic events as in claim 1, wherein the means for measuring the indicia of the detectable energy state of a portion of the local environment is a temperature sensor.

3. System for forecasting catastrophic events as in claim 1, wherein the means for measuring the indicia of the detectable energy state of a portion of the local environment includes a bridge circuit having a thermistor.

4. System for forecasting catastrophic events as in claim 3, wherein the change in resistance of the thermistor provides an indicia of the detectable energy state of a portion of the local environment.

5. System for forecasting catastrophic events as in claim 1, wherein the means for measuring the indicia of the detectable energy state of a portion of the local environment interfaces with the input of a data processing means.

6. System for forecasting catastrophic events as in claim 5, wherein the means for determining when the indicia of the energy state of a portion of the local environment will be at a minimum includes programming within the data processing means for comparing the values of the indicia of the detectable energy state of a portion of the local environment during successive generations of the local non-equilibrium process.

7. System for forecasting catastrophic events as in claim 6, wherein the means for determining when the indicia of the energy state of a portion of the local environment will be at a minimum includes programming within the data processing means for calculating when the magnitude of the indicia of the energy state of a portion of the local environment will be at a minimum.

8. System for forecasting catastrophic events as in claim 1, wherein the means for generating a reproducible non-equilibrium process within the local environment includes a hydraulic press acting on a rock portion.

9. System for forecasting catastrophic events as in claim 1, wherein the means for measuring an indicia of the detectable energy state of a portion of the local environment includes at least two means for measuring indicia of the detectable energy state within the measuring station, each means measuring an indicia of the detectable energy state of a separate portion of the local environment during generation of the non-equilibrium process.

10. System for forecasting catastrophic events as in claim 9, wherein the difference of energy state between pairs of means for measuring an indicia of the detectable energy state of a portion of the local environment of the measuring station during generation of the non-equilibrium process provides a measure of the energy state of a portion of the local environment.

11. System for forecasting catastrophic events as in claim 10, wherein each means for measuring the energy state of a portion of the local environment interfaces with the input of the means for determining when the indicia of the energy state of a portion of the local environment will be at a minimum.

12. A system for forecasting catastrophic events, comprising
   a) three or more geographically separated, networked measuring stations each having:
      i) means for generating a reproducible non-equilibrium process within a local environment having a detectable energy state at a given time; and
      ii) means for measuring an indicia of the detectable energy state of a portion of the local environment simultaneous with the generation of the reproducible non-equilibrium process,
   b) means for providing an indicia of the change in the energy state of portions of the local environment for successively generated non-equilibrium processes at each measuring station, and
   c) means for determining the location of the catastrophic event from the indicia of changes in energy state at each measuring station.

13. System for forecasting catastrophic events as in claim 12, wherein the means for determining the location of the catastrophic event includes data processing means interfacing with the means for providing an indicia of the change in the energy state of portions of the local environment for successively generated non-equilibrium processes at each measuring station.

14. System for forecasting catastrophic events as in claim 13, wherein the data processing means includes the means for providing an indicia of the change in the energy state of portions of the local environment for successively generated non-equilibrium processes at each measuring station.

15. System for forecasting catastrophic events as in claim 14, wherein the data processing means interfaces with the means for measuring the indicia of the detectable energy state of a portion of the local environment for each measuring station.

16. System for forecasting catastrophic events as in claim 12, wherein each measuring station includes a separate means for providing an indicia of the change in the energy state of portions of the local environment for successively generated non-equilibrium processes at each measuring station.

17. A system for forecasting catastrophic events, comprising
   a) three or more geographically separated, networked measuring stations each having:
      i) means for generating a reproducible non-equilibrium process within a local environment having a detectable energy state at a given time; and ii) means for measuring an indicia of the detectable energy state of a portion of the local environment simultaneous with the generation of the reproducible non-equilibrium process, b) means for providing an indicia of the change in the energy state of portions of the local environment for successively generated non-equilibrium processes at each measuring station, and c) means for determining the energy of the catastrophic event from the indicia of changes in energy state at each networked measuring station.

18. Method for forecasting catastrophic events, comprising the steps of:

a) periodically generating a reproducible non-equilibrium process within a local environment having a detectable energy state at a given time;

b) measuring an indicia of the detectable energy state of a portion of the local environment during generation of the non-equilibrium process; and c) approximating when an impending catastrophic event will occur from the measurements of the indicia of the detectable energy state of a portion of the local environment during successive generations of the non-equilibrium process.

19. Method for forecasting catastrophic events as in claim 18, wherein the step of approximating when an impending catastrophic event will occur includes calculating when the indicia of the detectable energy state of a portion of the local environment will be minimized.

20. Method as in claim 18, wherein the step of measuring an indicia of the detectable energy state of a portion of the local environment during generation of the non-equilibrium process includes measuring indicia of the energy state at two or more locations within the local environment.

21. Method as in claim 20, wherein the step of measuring an indicia of the detectable energy state of a portion of the local environment during generation of the non-equilibrium process includes determining the difference in the indicia of energy state measured at the two or more locations within the local environment.

22. Method for forecasting catastrophic events, comprising the steps of:

a) periodically generating three or more geographically separated, reproducible non-equilibrium processes within respective local environments having detectable energy states at a given time;

b) measuring an indicia of the detectable energy states of a portion of each of the local environments during generation of each respective non-equilibrium process; and c) approximating the energy and location of an impending catastrophic event from the measurements of the indicia of the energy states of a portion of each of the local environments during successive generations of each respective non-equilibrium process.

23. Method as in claim 22, wherein the step of approximating the energy and location of an impending catastrophic event from the measurements of the indicia of the energy states of a portion of each of the local environments during successive generations of each respective non-equilibrium processes includes the step of measuring changes in the indicia of the energy states of a portion of each of the local environments during two successive generations of each respective non-equilibrium processes.

24. Method as in claim 23, wherein the step of measuring changes in the indicia of the energy states of a portion of each of the local environments includes measuring the temperature of a portion of the environment local to each respective non-equilibrium process.

25. Method as in claim 23, wherein the step of measuring changes in the indicia of the energy states of a portion of the local environments includes measuring the resistance of a portion of an electrical circuit positioned within the local environment of each respective non-equilibrium process.

* * * * *